(12) United States Patent
Troska et al.

(10) Patent No.: US 12,459,237 B2
(45) Date of Patent: Nov. 4, 2025

(54) LAMINATED GLAZING COMPRISING A BIRD PROTECTION PATTERN

(71) Applicant: KURARAY EUROPE GMBH, Hattersheim am Main (DE)

(72) Inventors: Christoph Troska, Herten (DE); Jochen Regenauer, Hattersheim am Main (DE)

(73) Assignee: KURARAY EUROPE GMBH, Hattersheim am Main (DE)

( * ) Notice: Subject to any disclaimer, the term of this patent is extended or adjusted under 35 U.S.C. 154(b) by 0 days.

(21) Appl. No.: 18/839,061

(22) PCT Filed: Feb. 6, 2023

(86) PCT No.: PCT/EP2023/052853
§ 371 (c)(1),
(2) Date: Aug. 16, 2024

(87) PCT Pub. No.: WO2023/156238
PCT Pub. Date: Aug. 24, 2023

(65) Prior Publication Data
US 2025/0108584 A1    Apr. 3, 2025

(30) Foreign Application Priority Data
Feb. 18, 2022   (EP) ..................................... 22157507

(51) Int. Cl.
*B32B 17/10* (2006.01)
*A01M 29/08* (2011.01)

(52) U.S. Cl.
CPC ....... *B32B 17/10275* (2013.01); *A01M 29/08* (2013.01); *B32B 17/10036* (2013.01); *B32B 17/10605* (2013.01); *B32B 17/10761* (2013.01); *B32B 2250/04* (2013.01); *B32B 2255/10* (2013.01); *B32B 2307/4023* (2013.01); *B32B 2307/41* (2013.01)

(58) Field of Classification Search
CPC ........ B32B 17/10275; B32B 17/10036; B32B 17/10605; B32B 17/10761; B32B 2250/04; B32B 2255/10; B32B 2307/4023; B32B 2307/41; A01M 29/08
See application file for complete search history.

(56) References Cited

U.S. PATENT DOCUMENTS

| | | | |
|---|---|---|---|
| 2009/0047487 A1* | 2/2009 | Klem, Jr. ............... | A01M 29/06 428/210 |
| 2014/0110039 A1* | 4/2014 | Lellig ........................ | C08J 5/18 524/91 |
| 2015/0323716 A1* | 11/2015 | Greb ....................... | G02B 5/201 156/99 |
| 2016/0263866 A1* | 9/2016 | Keller ............... | B32B 17/10201 |
| 2020/0215796 A1* | 7/2020 | Butler ............... | B32B 17/10761 |
| 2022/0363037 A1* | 11/2022 | Keller .................. | B32B 27/306 |

FOREIGN PATENT DOCUMENTS

WO    WO-2020173832 A1 *  9/2020

OTHER PUBLICATIONS

International Search Report and Written Opinion issued Apr. 13, 2023 in PCT/EP2023/052853, 7 pages.

* cited by examiner

*Primary Examiner* — Alicia Bland
(74) *Attorney, Agent, or Firm* — Element IP, PLC

(57) ABSTRACT

The invention is directed to laminated glazing comprising two glass sheets laminated by means of at least two thermoplastic interlayers wherein at least one surface of one of the interlayers is provided with a bird protection pattern in between the two thermoplastic interlayers and wherein at least one thermoplastic interlayer comprises a polyvinyl acetal.

15 Claims, No Drawings

LAMINATED GLAZING COMPRISING A BIRD PROTECTION PATTERN

The invention is directed to laminated glazing comprising two glass sheets laminated by means of at least two thermoplastic interlayers wherein at least one surface of one of the interlayers is provided with a bird protection pattern in between the two thermoplastic interlayers and wherein at least one thermoplastic interlayer comprises a polyvinyl acetal.

Window strikes represent one of the greatest threats to birds because window glazing is not perceived as a barrier to the bird. Effort has been made to develop bird-safe glazing by transforming window glass into a barrier that birds will see and avoid. Such glass usually has bird protection patterns, i.e. visual markers, across the surface of the glazing to distort the reflections of surrounding elements. Such patterns are generally printed directly onto the surface of one of the glass sheets, e.g. by enamel printing. However, such printing techniques are not very flexible and rather expensive in the production process. Additionally, they can lead to a reduction in the quality of the glass as enamel printing requires high temperatures.

Laminated glazing usually consists of two glass sheets laminated by means of thermoplastic interlayer films. Such films are often made from plasticiser-containing polyvinyl acetals like polyvinyl butyral (PVB).

Thus, modification of the surface of the thermoplastic interlayer with a bird-protection pattern and subsequent lamination between two glass sheets would also be a possible solution. However, it has now been found by the present inventors that this approach has various disadvantages. A bird-protection pattern printed or coated onto the surface of the interlayer using an ink, can interfere with the glass surface and thus, lead to problems with the adhesion of the interlayer to the glass. This can impede the safety of the laminated glazing.

Additionally, it has been surprisingly found that the optical quality, especially in terms of a sharp boarder of the individual objects making up the bird protection pattern, is reduced when the patterns is in direct contact to the glass surface. This decrease in optical quality will inevitably lead to a lower economic value of the windows produced.

The problem addressed by the present invention was therefore to provide a laminated glass comprising a bird protection pattern with improved stability, improved optical quality, improved duration and/or improved processibility. These and other problems have been solved by the present invention.

Accordingly, a first aspect of the present invention concerns a laminated glazing for reducing or preventing bird collision comprising at least two glass sheets and at least a first and a second thermoplastic interlayer, characterized in that at least one surface of the first thermoplastic interlayer is provided with a bird protection pattern facing the second thermoplastic interlayer and wherein the first thermoplastic interlayer comprises a polyvinyl acetal. Preferably, the bird protection pattern is printed or coated onto the at least one surface of the first thermoplastic interlayer.

In other words, the bird-protection pattern is sandwiched between the first and the second thermoplastic interlayer and thus, the pattern is not in direct contact with a glass surface of one of the two glass sheets. This feature highly improves the adhesion of the interlayer to the glass sheets and thus, ensures the safety of the laminated glazing. Furthermore, the optical quality of the individual features of the pattern is highly improved.

Additionally, fading or deterioration of the pattern from an exposure to sunlight can be reduced by using a UV-blocking agents present in the two interlayer films on both sides of the pattern.

Also preferably, the bird protection pattern has a transparency for light in the range from 380 to 750 nm of less than 5%. In this embodiment, the bird protection pattern can have any colour. However, it is preferably black or grey.

Alternatively, the bird protection pattern has a transparency for light in the range from 380 to 750 nm of more than 50% and comprises a UV absorber or a UV reflective agent.

Unlike humans, many birds are tetrachromatic and can see light in the UV range. Thus, the bird protection pattern can also be present on the first thermoplastic interlayer by means of a UV absorbing or UV reflecting agent. These patterns can then be seen by the birds but are being conceived as clear to the human eye.

Examples of suitable UV reflecting agents are tin or titanium oxide. They may be deposited onto the surface of the first thermoplastic interlayer by any conventional thin film deposition, coating or printing technique.

Examples of suitable UV absorbers include benzotriazole-based compounds, benzophenone-based compounds, triazine-based compounds, benzoate-based compounds, malonic ester-based compounds, or oxalic anilide-based compounds.

More preferably, the UV absorber is a benzotriazole-based UV absorber such as 2-(5-methyl-2-hydroxyphenyl)benzotriazole, 2-[2-hydroxy-3,5-bis(α,ω-dimethylbenzyl)phenyl]-2H-benzotriazole, 2-(3,5-di-t-butyl-2-hydroxyphenyl)benzotriazole, 2-(5-chloro-2-benzotriazolyl)-6-tert-butyl-p-cresol, 2-(3-t-butyl-5-methyl-2-hydroxyphenyl)-5-chlorobenzotriazole, 2-(3,5-di-t-butyl-5-methyl-2-hydroxyphenyl)-5-chlorobenzotriazole, 2-(3,5-di-t-amyl-2-hydroxyphenyl)benzotriazole, and 2-(2'-hydroxy-5'-t-octylphenyl)benzotriazole; or a hindered amine-based UV absorber such as 2,2,6,6-tetramethyl-4-piperidylbenzoate, bis(2,2,6,6-tetramethyl-4-piperidyl)sebacate, bis(1,2,2,6,6-pentamethyl-4-piperidyl)-2-(3,5-di-t-butyl-4-hydroxybenzyl)-2-n-butylmalonate, and 4-(3-(3,5-di-t-butyl-4-hydroxyphenyl)propionyloxy)-1-(2-(3-(3,5-di-t-butyl-4-hydroxyphenyl)propionyloxy)ethyl)-2,2,6,6-tetramethylpiperidine; or a benzoate-based UV absorber such as 2,4-di-t-butylphenyl-3,5-di-t-butyl-4-hydroxybenzoate, and hexadecyl-3,5-di-t-butyl-4-hydroxybenzoate. Most preferably, the UV absorber has a hydroxyphenyl benzotriazole structural unit. Especially preferred is 2-(2H-benzotriazol-2-yl)-4,6-bis(1-methyl-1-phenylethyl)phenol.

The transparency for light in the range from 380 to 750 nm is measured according to JIS R 3106.

The bird protection pattern can have any shape or motif. Preferably, the bird protection pattern comprises a plurality of separate elements such as dots, lines or grids. More preferably, the separate elements have a main dimension of 1 mm to 10 mm. Most preferably, the bird protection pattern is a dot pattern.

Surprisingly, it has also been found that laminated glazing with a low yellowness index db of the laminated glazing in the areas not comprising the bird protection pattern, i.e. in the areas where no coating or printing is present and the laminated glazing appears transparent, give especially advantageous results in terms of bird deterrence. It is believed that these highly clear areas increase the contrast to the printed/coated areas on the first interlayer and thus, the latter can more easily be detected by the birds. Accordingly, a preferred embodiment of the invention concerns a laminated glazing wherein the yellowness index db of the laminated glazing in the areas not comprising the bird protection pattern is less than 3, preferably less than 2.5, more preferably less than 2 and particularly preferably less than 1.0.

The yellowness is determined by the transmission of the film according to EN 410 at 430 nm on a ColorQuest XE in the Hunterlab 2°/C setting.

Preferably, the thickness of the first and the second thermoplastic interlayer is independently 450-2500 µm, more preferably 600-1000 µm, and most preferably 700-900 µm.

Alternatively, one of the thermoplastic interlayers can have a much lower thickness if the other one has a thickness as described hereabove. In this embodiment, the thinner thermoplastic interlayer is less than 100 µm, preferably 10-100 µm, more preferably 15-75 µm, most preferably 20-50 µm and specifically around 25 µm.

Preferably, both the first and the second thermoplastic interlayers contains a polyvinyl acetal.

The films can contain polyvinyl acetals, each having a different polyvinyl alcohol content, degree of acetalization, residual acetate content, ethylene proportion, molecular weight and/or different chain lengths of the aldehyde of the acetal groups.

In particular, the aldehydes used for the production of the polyvinyl acetals can be linear or branched (that is to say of the "n" or "iso" type) containing 2 to 10 carbon atoms, which leads to corresponding linear or branched acetal groups. The polyvinyl acetals are referred to accordingly as "polyvinyl (iso)acetals" or "polyvinyl (n)acetals".

Especially preferred is polyvinyl butyral.

The polyvinyl acetals used have a proportion of polyvinyl acetate groups of 0.1 to 20 mol %, preferably 0.5 to 3 mol %, or 5 to 8 mol %.

The polyvinyl alcohol content of the polyvinyl acetals may be between 6-26% by weight, 8-24% by weight, 10-22% by weight, 12-21% by weight, 14-20% by weight, 16-19% by weight and preferably between 16 and 21% by weight or 10-16% by weight.

The vinyl alcohol content and vinyl acetate content of the polyvinyl acetal are determined in accordance with DIN ISO 3681 (Acetate content) and DIN ISO 53240 (PVA content).

Preferably, the first and the second thermoplastic interlayer contain at least 16% by weight, such as 16.1-36.0% by weight, preferably 22.0-32.0% by weight and in particular 26.0-30.0% by weight plasticiser.

Alternatively, one the two interlayer films may contain less than 18% by weight (such as 17.9% by weight), less than 12% by weight, less than 8% by weight, less than 6% by weight, less than 4% by weight, less than 3% by weight, less than 2% by weight, less than 1% by weight or even no plasticiser (0.0% by weight) if the other interlayer contains substantial amounts of plasticizer in the ranges given hereabove.

Suitable plasticisers can be selected from the following groups:
  esters of polyvalent aliphatic or aromatic acids, for example dialkyl adipates, such as dihexyl adipate, dioctyl adipate, hexyl cyclohexyl adipate, mixtures of heptyl adipates and nonyl adipates, diisononyl adipate, heptyl nonyl adipate, and esters of adipic acid with cycloaliphatic ester alcohols or ester alcohols containing ether compounds, dialkyl sebacates, such as dibutyl sebacate, and also esters of sebacic acid with cycloaliphatic ester alcohols or ester alcohols containing ether compounds, esters of phthalic acid, such as butyl benzyl phthalate or bis-2-butoxyethyl phthalate.

esters or ethers of polyvalent aliphatic or aromatic alcohols or oligo ether glycols with one or more unbranched or branched aliphatic or aromatic substituents, for example esters of glycerol, diglycols, triglycols or tetraglycols with linear or branched aliphatic or cycloaliphatic carboxylic acids; Examples of the latter group include diethylene glycol-bis-(2-ethyl hexanoate), triethylene glycol-bis-(2-ethyl hexanoate), triethylene glycol-bis-(2-ethyl butanoate), tetraethylene glycol-bis-n-heptanoate, triethylene glycol-bis-n-heptanoate, triethylene glycol-bis-n-hexanoate, tetraethylene glycol dimethyl ether and/or dipropylene glycol benzoate phosphates with aliphatic or aromatic ester alcohols, such as tris(2-ethylhexyl)phosphate (TOF), triethyl phosphate, diphenyl-2-ethylhexyl phosphate, and/or tricresyl phosphate esters of citric acid, succinic acid and/or fumaric acid.

In addition, the films may contain further additives, such as residual quantities of water, antioxidants, adhesion regulators, optical brighteners or fluorescent additives, stabilisers, colorants, processing aids, organic nanoparticles, pyrogenic silicic acid and/or surface active substances. In particular, the films may comprise 0.001 to 0.1% by weight of alkaline salts and/or alkaline earth salts of carboxylic acids as adhesion regulators.

The films may further contain one or more of the UV absorbers described above in the bulk of the material in addition to or instead of the UV absorber used for forming the bird protection pattern on the surface of the interlayer.

The laminated glazing of the invention can be used for a variety of architectural applications, including windows, structural architectural panels in buildings or stadiums, decorative architectural panels, indoor or outdoor stairs or platforms, pavement or sidewalk skylights, balustrades, curtain walls, flooring, balconies, support columns, skylights and privacy screens.

In a second aspect, the present invention concerns a glass window comprising the laminated glazing according to the present invention and further comprising a third glass sheet separated by air from the first glass sheet or the second glass sheet. Such glass windows are generally used for improved thermal and/or noise insulation purposes.

The present invention also relates to a method for producing the glass laminates described above.

The first and the second thermoplastic interlayer can be any conventional polyvinyl butyral sheet, e.g. the Trosifol® range of products commercially available from Kuraray Europe GmbH, e.g. in a thickness of 0.76 mm.

The bird protection pattern can be coated or printed onto at least one surface of the first thermoplastic interlayer. The printed or coated layer usually contains an inorganic or organic pigment, which should not dissolve in the polymer matrix.

Suitable pigments include carbon black, iron oxides, polyaniline, perylenes or spinel pigments are used. The pigments may be dispersed in a carrier fluid like water, alcohol or mixtures of alcohol and water. Furthermore, binders like polyvinyl alcohol, polyvinyl butyral, polyvinylpyrrolidone, polyacrylates, polyurethanes or poly styrene-acrylate may be present. Such printing compositions are referred to as "printing inks" or simple "inks" hereinafter.

Water-based printing inks are preferred over printing inks based on organic solvents since they do not swell or dissolve the films and/or lead to film defects.

The printing inks can be applied via techniques that are commonly known in the printing industry such as offset printing, rotogravure printing, flexography, and screen-printing, followed usually by a drying step.

The dry-film thickness of the printed parts is 1-50 μm depending on the printing technique and the opacity required. Usually, the dry-film thickness is 10-30 μm. The total dry-film thicknesses can be achieved by overlaying several ink-layers from sequential steps of printing or coating.

Subsequently, the laminated glazing can be prepared by combining the first and the second thermoplastic interlayer such that the bird protection pattern is in touch with a main surface of the second thermoplastic interlayer followed by lamination of the thus prepared interlayer stack between two glass sheets.

Vacuum laminators can be used. These consist of a chamber that can be heated and evacuated, in which laminated glazing can be laminated within 30-60 minutes. Reduced pressures from 0.01 to 300 mbar and temperatures from 100 to 200° C., in particular 130-160° C., have proven their worth in practice.

The invention claimed is:

1. A laminated glazing, comprising:
   at least two glass sheets; and
   at least a first and a second thermoplastic interlayer;
   wherein:
   at least one surface of the first thermoplastic interlayer comprises a bird protection pattern facing the second thermoplastic interlayer;
   the first thermoplastic interlayer comprises a polyvinyl acetal;
   the first and the second thermoplastic interlayer each contain at least 26.0% by weight plasticizer;
   the thickness of the first and the second thermoplastic interlayer is independently 450-2500 μm; and
   a yellowness index db of the laminated glazing in areas not comprising the bird protection pattern is less than 1.0 as determined by transmission of a film according to EN 410 at 430 nm on a ColorQuest XE in the Hunterlab 2°/C setting.

2. The laminated glazing according to claim 1 wherein the bird protection pattern is printed or coated onto the at least one surface of the first thermoplastic interlayer.

3. The laminated glazing according to claim 1 wherein the bird protection pattern has a transparency for light in a range from 380 to 750 nm of less than 5% measured according to JIS R 3106.

4. The laminated glazing according to claim 1 wherein the bird protection pattern comprises a plurality of separate elements.

5. The laminated glazing according to claim 4 wherein the separate elements have a main dimension of 1 mm to 10 mm.

6. The laminated glazing according to claim 4 wherein the bird protection pattern is a dot pattern.

7. The laminated glazing according to claim 1 wherein the second thermoplastic interlayer comprises a polyvinyl acetal.

8. The laminated glazing according to claim 1 wherein at least one selected from the group consisting of the first thermoplastic interlayer and the second thermoplastic interlayer comprises a polyvinyl butyral (PVB).

9. The laminated glazing according to claim 1, wherein the first and the second thermoplastic interlayer each contain 26.0-36.0% by weight plasticizer.

10. The laminated glazing according to claim 1, wherein the first and the second thermoplastic interlayer each contain 26.0-30.0% by weight plasticizer.

11. The laminated glazing according to claim 1, wherein the thickness of the first and the second thermoplastic interlayer is independently 600-1000 μm.

12. The laminated glazing according to claim 10, wherein the thickness of the first and the second thermoplastic interlayer is independently 600-1000 μm.

13. The laminated glazing according to claim 1, wherein the thickness of the first and the second thermoplastic interlayer is independently 700-900 μm.

14. The laminated glazing according to claim 10, wherein the thickness of the first and the second thermoplastic interlayer is independently 700-900 μm.

15. A glass window comprising:
   the laminated glazing according to claim 1; and
   a third glass sheet separated by air from the first glass sheet or the second glass sheet.

* * * * *